US010903934B2

(12) United States Patent
Bush et al.

(10) Patent No.: US 10,903,934 B2
(45) Date of Patent: *Jan. 26, 2021

(54) SYSTEM AND METHOD FOR CONTROLLING TIME DILATION IN TIME-SENSITIVE NETWORKS

(71) Applicant: General Electric Company, Schenectady, NY (US)

(72) Inventors: Stephen Francis Bush, Niskayuna, NY (US); Guillaume Mantelet, Oakbank (CA)

(73) Assignee: General Electric Company, Schenectady, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/682,929

(22) Filed: Nov. 13, 2019

(65) Prior Publication Data

US 2020/0083978 A1    Mar. 12, 2020

Related U.S. Application Data

(63) Continuation of application No. 15/835,056, filed on Dec. 7, 2017, now Pat. No. 10,511,403.

(Continued)

(51) Int. Cl.
*H04K 1/00* (2006.01)
*H04L 9/08* (2006.01)
(Continued)

(52) U.S. Cl.
CPC ............. *H04K 1/00* (2013.01); *H04J 3/0697* (2013.01); *H04L 9/0852* (2013.01);
(Continued)

(58) Field of Classification Search
CPC ......... H04W 64/00; H04L 49/90; H04L 7/02; H04L 7/0054; H04L 43/0852; H04L 45/121; H04L 27/2626; H04L 27/2647; H04L 1/0687; H04N 21/23406; H04N 21/23608; H04N 21/2389; H04N 21/42692; H04N 21/4435; H04N 21/4341; H04N 21/4344; H04N 21/4385; H04N 21/44004; H04N 21/4305; H04J 3/06; H04J 3/0664; H04J 3/0682; H04J 3/0667; G06F 3/00;
(Continued)

(56) References Cited

U.S. PATENT DOCUMENTS 7,590,151 B2 * 9/2009 Middleton ............ H04J 3/0664
370/508
2003/0177154 A1 * 9/2003 Vrancic ...................... G06F 1/12
708/160

(Continued)

*Primary Examiner* — Hardikkumar D Patel
(74) *Attorney, Agent, or Firm* — Christopher R. Carroll; The Small Patent Law Group LLC

(57) ABSTRACT

A system and method determine a clock drift and a clock variance of each node in plural nodes of a time-sensitive Ethernet network. An accumulated clock offset along a time-sensitive network path in the time-sensitive network is determined based on the clock drifts and the clock variances. A guard band having a dynamic size is determined based on the accumulated clock offset. The times at which Ethernet frames are communicated through the nodes are restricted by communicating the guard band with the dynamic size to one or more of the nodes.

18 Claims, 6 Drawing Sheets

Related U.S. Application Data

(60) Provisional application No. 62/575,719, filed on Oct. 23, 2017.

(51) Int. Cl.
| | |
|---|---|
| *H04L 29/06* | (2006.01) |
| *H04J 3/06* | (2006.01) |
| *H04L 9/32* | (2006.01) |

(52) U.S. Cl.
CPC ........ *H04L 9/3297* (2013.01); *H04L 63/0227* (2013.01); *H04L 63/061* (2013.01); *H04L 63/12* (2013.01); *H04L 63/108* (2013.01); *H04L 63/123* (2013.01)

(58) Field of Classification Search
CPC ....... G06F 1/12; G06F 17/5031; H04B 7/216; H04B 7/04; H04B 7/043; H04K 1/10
See application file for complete search history.

(56) References Cited

U.S. PATENT DOCUMENTS

| | | | |
|---|---|---|---|
| 2007/0183310 A1* | 8/2007 | Nakamura | H04L 5/0016 370/208 |
| 2007/0280367 A1* | 12/2007 | Nakao | H04B 7/043 375/260 |
| 2016/0192303 A1* | 6/2016 | Tender | H04B 7/18513 370/316 |
| 2016/0198423 A1* | 7/2016 | Liu | H04W 64/00 370/350 |
| 2019/0089502 A1* | 3/2019 | Yi | H04L 5/0041 |

* cited by examiner

SYSTEM AND METHOD FOR CONTROLLING TIME DILATION IN TIME-SENSITIVE NETWORKS

CROSS-REFERENCE TO RELATED APPLICATIONS

This application is a continuation of U.S. patent application Ser. No. 15/835,056, filed 7 Dec. 2017, which claims priority to U.S. Provisional Patent Application No. 62/575,719, which was filed on 23 Oct. 2017. The entire disclosures of these applications are incorporated herein by reference.

FIELD

The subject matter described herein relates to computerized communication networks, such as time-sensitive networks.

BACKGROUND

The IEEE 802.1 Time-Sensitive Networking Task Group has created a series of standards that describe how to implement deterministic, scheduled Ethernet frame delivery within an Ethernet network. Time-sensitive networking benefits from advances in time precision and stability to create efficient, deterministic traffic flows in an Ethernet network.

But, clocks in the networks have not achieved the level of accuracy and stability to perfectly schedule time-sensitive network flows. Clock synchronization errors may lead the frames to arrive ahead or behind their schedule. In this case, time-sensitive network frames can be delayed in an unpredictable manner, thus defeating the purpose of a deterministic Ethernet.

BRIEF DESCRIPTION

In one embodiment, a method includes determining a clock drift and a clock variance of each node in plural nodes of a time-sensitive Ethernet network, determining an accumulated clock offset along a time-sensitive network path in the time-sensitive network based on the clock drifts and the clock variances that are determined, determining a guard band having a dynamic size based on the accumulated clock offset, and restricting when Ethernet frames are communicated through the nodes by communicating the guard band with the dynamic size to one or more of the nodes.

In one embodiment, a system includes one or more processors configured to determine a clock drift and a clock variance of each node in plural nodes of a time-sensitive network. The one or more processors also are configured to determine an accumulated clock offset along a time-sensitive network path in the time-sensitive network based on the clock drifts and the clock variances that are determined. The one or more processors also are configured to determine a guard band having a dynamic size based on the accumulated clock offset and to communicate the guard band with the dynamic size to the nodes. The one or more processors are configured to allocate the guard band to at least one of the nodes. The guard band restricts when Ethernet frames are communicated through the at least one of the nodes.

In one embodiment, a system includes one or more processors configured to determine clock drifts and clock variances of plural nodes in a time-sensitive Ethernet network. The one or more processors also are configured to determine an eigenvalue centrality metric based on a location of one or more of the nodes in the time-sensitive network. The one or more processors are configured to dynamically allocate a guard band to one or more of the nodes to prevent communication of one or more Ethernet frames through the one or more nodes during the guard band in a time sensitive network schedule of the Ethernet network. The one or more processors are configured to dynamically allocate the guard band based on the clock drifts, the clock variances, and the eigenvalue centrality metric.

BRIEF DESCRIPTION OF THE DRAWINGS

The present inventive subject matter will be better understood from reading the following description of non-limiting embodiments, with reference to the attached drawings, wherein below.

DETAILED DESCRIPTION

One or more embodiments of the inventive subject matter described herein provide systems and methods that use efficient determinism of time-sensitive networking to increase cybersecurity by examining positive feedback between non-classical physics and time-sensitive networking. The difference of elapsed time that occurs due to relativity is treated by the timing and synchronization standard as a contribution to clock drift of network nodes (e.g., switches) and a time-aware scheduler device of a time-sensitive network is configured relative to a time reference of a grandmaster clock device of the network, but then loses simultaneity with a local relative time reference of the scheduler device.

Figure 1:
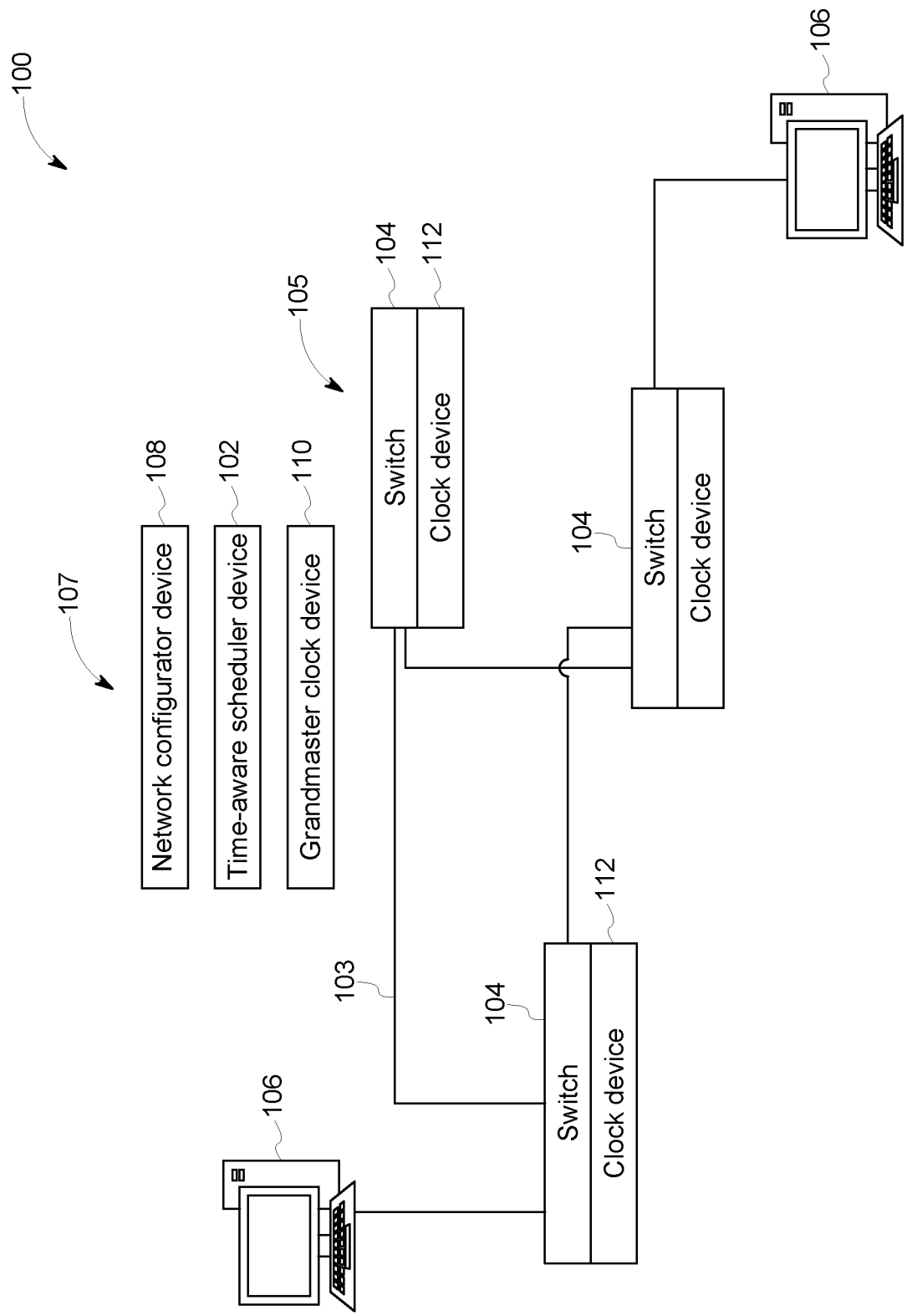
FIG. 1 schematically illustrates one embodiment of a time-sensitive network system.

FIG. 1 schematically illustrates one embodiment of a network control system 107 of a time-sensitive network system 100. The components shown in FIG. 1 represent hardware circuitry that includes and/or is connected with one or more processors (e.g., one or more microprocessors, field programmable gate arrays, and/or integrated circuits) that operate to perform the functions described herein. The components of the network system 100 can be communicatively coupled with each other by one or more wired and/or wireless connections. Not all connections between the components of the network system 100 are shown herein.

The network system 100 includes several nodes 105 formed of network switches 104 and associated clocks 112 ("clock devices" in FIG. 1). While only a few nodes 105 are shown in FIG. 1, the network system 100 can be formed of many more nodes 105 distributed over a large geographic area. The network system 100 can be an Ethernet network that communicates data signals along, through, or via Ethernet links 103 between devices 106 (e.g., computers, control systems, etc.) through or via the nodes 105. The data signals are communicated as data packets sent between the nodes 105 on a schedule of the network system 100, with the schedule restricted what data signals can be communicated by each of the nodes 105 at different times. For example, different data signals can be communicated at different repeating scheduled time periods based on traffic classifications of the signals. Some signals are classified as time-critical traffic while other signals are classified as best effort traffic. The time-critical traffic can be data signals that need or are required to be communicated at or within designated periods of time to ensure the safe operation of a powered system. The best effort traffic includes data signals that are not required to ensure the safe operation of the powered system, but that are communicated for other purposes (e.g., monitoring operation of components of the powered system).

The control system 107 includes a time-aware scheduler device 102 that enables each interface of a node 105 to transmit an Ethernet frame (e.g., between nodes 105 from one computer device 106 to another device 106) at a prescheduled time, creating deterministic traffic flows while sharing the same media with legacy, best-effort Ethernet traffic. The time-sensitive network 100 has been developed to support hard, real-time applications where delivery of frames of time-critical traffic must meet tight schedules without causing failure, particularly in life-critical industrial control systems. The scheduler device 102 computes a schedule that is installed at each node 105 in the network system 100. This schedule dictates when different types or classification of signals are communicated by the switches 104.

The scheduler device 102 remains synchronized with a grandmaster clock device 110 as clock instability results in unpredictable latency when frames are transmitted. The grandmaster clock device 110 is a clock to which clock devices 112 of the nodes 105 are synchronized. A consequence of accumulated clock drift is that a frame misses a time window for the frame, and must wait for the next window. This can conflict with the next frame requiring the same window.

A centralized network configurator device 108 of the control system 107 is comprised of software and/or hardware that has knowledge of the physical topology of the network 100 as well as desired time-sensitive network traffic flows. The configurator device 108 can be formed from hardware circuitry that is connected with and/or includes one or more processors that determine or otherwise obtain the topology information from the nodes 105 and/or user input. The hardware circuitry and/or processors of the configurator device 108 can be at least partially shared with the hardware circuitry and/or processors of the scheduler device 102.

The topology knowledge of the network system 100 can include locations of nodes 105 (e.g., absolute and/or relative locations), which nodes 105 are directly coupled with other nodes 105, etc. The configurator device 108 can provide this information to the scheduler device 102, which uses the topology information to determine the schedules. The configurator device 108 and/or scheduler device 102 can communicate the schedule to the different nodes 105.

A link layer discovery protocol can be used to exchange the data between the configurator device 108 and the scheduler device 102. The scheduler device 102 communicates with the time-aware systems (e.g., the switches 104 with respective clocks 112) through a network management protocol. The time-aware systems implement a control plane element that forwards the commands from the centralized scheduler device 102 to their respective hardware.

The Timing and Synchronization standard is an enabler for the scheduler device 102. The IEEE 802.1AS (gPTP) standard can be used by the scheduler device 102 to achieve clock synchronization by choosing the grandmaster clock device 110 (e.g., which may be a clock device 112 of one of the switch devices 104), estimating path delays, and compensating for differences in clock rates, thereby periodically pulling clock devices 112 back into alignment with the time that is kept by the grandmaster clock device 110. By pulling the clock devices 112 back into alignment with the grandmaster clock device 112, the use of phase locked loops (PLL) are not used in one embodiment of the network system 100 due to the slow convergence of the loops and because the loops are prone to gain peaking effect.

The clock devices 112 can be measured by the configurator device 108 or the grandmaster clock device 110 periodically or otherwise repeatedly sending generalized time-precision protocol messages (gPTP). The operation consists mainly of comparing the timestamps of the time-precision protocol messages the transmits or receives of local switch device 104 with the timestamps advertised by neighbor switch devices 104. This way, any factors affecting clock drift are correctly detected by the protocol.

A clock device 112 that is suddenly pulled into the past or moved to the future relative to the time kept by the grandmaster clock device 110 can impact the local execution of a time-aware schedule. For example, time-critical traffic may not be communicated by the node 105 that includes the non-synchronized clock device 112 within the scheduled time period for time-critical traffic. The gPTP standard provides a continuous and monotonically increasing clock device 112. Consequently, the scheduler device 102 relies on a clock device 112 that cannot be adjusted and alignment of the clock device 112 is based on logical syntonization, offset from the grand master clock device 110, the link propagation delays with the neighbors, and the clock drifts between the local clock devices 112.

The IEEE 802.1AS standard can be used to detect intrinsic instability and drift of a clock device 112. This drift can occur for a variety of reasons, such as aging of the clock device 112, changes in temperature or extreme temperatures, etc. Relativistic effects from the theory of special and general relativity can be viewed as an extrinsic clock drift and can encompass gravitational and motion time dilation. For example, two clock devices 112 with the same intrinsic parameters would detect no drift, but relativity would cause drift of the time kept by these clock devices 112 from the grandmaster clock device 110.

While general relativity can be rather complicated, gravitational time dilation is straight-forward to apply. In the equation that follows, G is the gravitational constant, M is the mass of the gravitational body in kilograms, R is the radius, or the distance from the center of the mass, in meters, and c is the speed of light in meters per second. Two clock devices 112, one located at a height of 100 m within the Earth's gravitational field and another at an infinite distance from a gravitational field, that is, experiencing no gravitation. Time passes slower within a gravitational field, so the hypothetical clock device 112 located at infinity would be the fastest known clock device 112. When one second has passed for the clock device 112 located at infinity, consider how much time has passed as measured by the clock near Earth. The time at infinity is denoted as T and the time on Earth as $T_0$. To determine how much time has passed on a clock device 112 at altitude h as compared to the passage of time measured on a clock at the surface of the earth, calculate the time dilation ratio at altitude h and divide this by the time dilation calculated at the surface of the earth, take the square root of the result and then multiply this calculated ratio by the time interval at the surface of the earth and the result of the calculation is the amount of time that has passed on the faster clock by 11 femtoseconds compared to the clock device 112 located higher in the field at altitude h.

$$T = \sqrt{\frac{1 - \frac{2GM}{(R+h)c^2}}{1 - \frac{2GM}{Rc^2}}} T_0 \quad (1)$$

Clock drift induced by gravitational time dilation seems negligible at first glance. Particularly when the speed of transmission is of 1 Gbps. It means that, to make an Ethernet frame of 64 bytes miss its Time-Aware schedule, 672 ns of drift must have elapsed if it is considered that for the 20 bytes of preamble, start frame delimiter, frame check sequence and interframe gap, for a port speed of 1 Gbps. With a difference of height clock of 100 m within the network, such a drift can be obtained within two years of uninterrupted service.

In one embodiment, the schedules provided by the configurator device 108 are relative to grandmaster time and may ignore time dilation. As a result, the schedules lose simultaneity. While neglecting time dilation can be done within an acceptable error margin, the inventive subject matter described herein addresses cases where error on the scheduler devices 102 due to relativity are important. That is, where error caused by clock drift at the nodes 105 can cause time-critical traffic to not be communicated within the scheduled time window for time-critical traffic at one or more of the nodes 105.

Several use cases involving pico-satellites or high-speed networks (for example, plane-to-ground transmissions, high speed train communications, smart cities interacting with cars in highways, etc.) subject to significant gravitational gradient are examples where relativity can cause significant drift in the scheduler device 102.

One or more embodiments of the inventive systems and methods described herein examine the impact of time synchronization error upon time-sensitive network scheduling by the scheduler device 102 of the control system 107, the impact of time synchronization error on the location, placement, or selection of the grandmaster clock device 110 in the network system 100, and the impact of time synchronization error on bandwidth. The systems and methods define specific local guard bands that dynamically change size based on changes in the time dilation. The guard bands are determined as time periods and/or network bandwidths in which non-time-critical Ethernet frame traffic cannot be communicated through the node or nodes that are allocated or assigned the guard bands.

Figure 2:
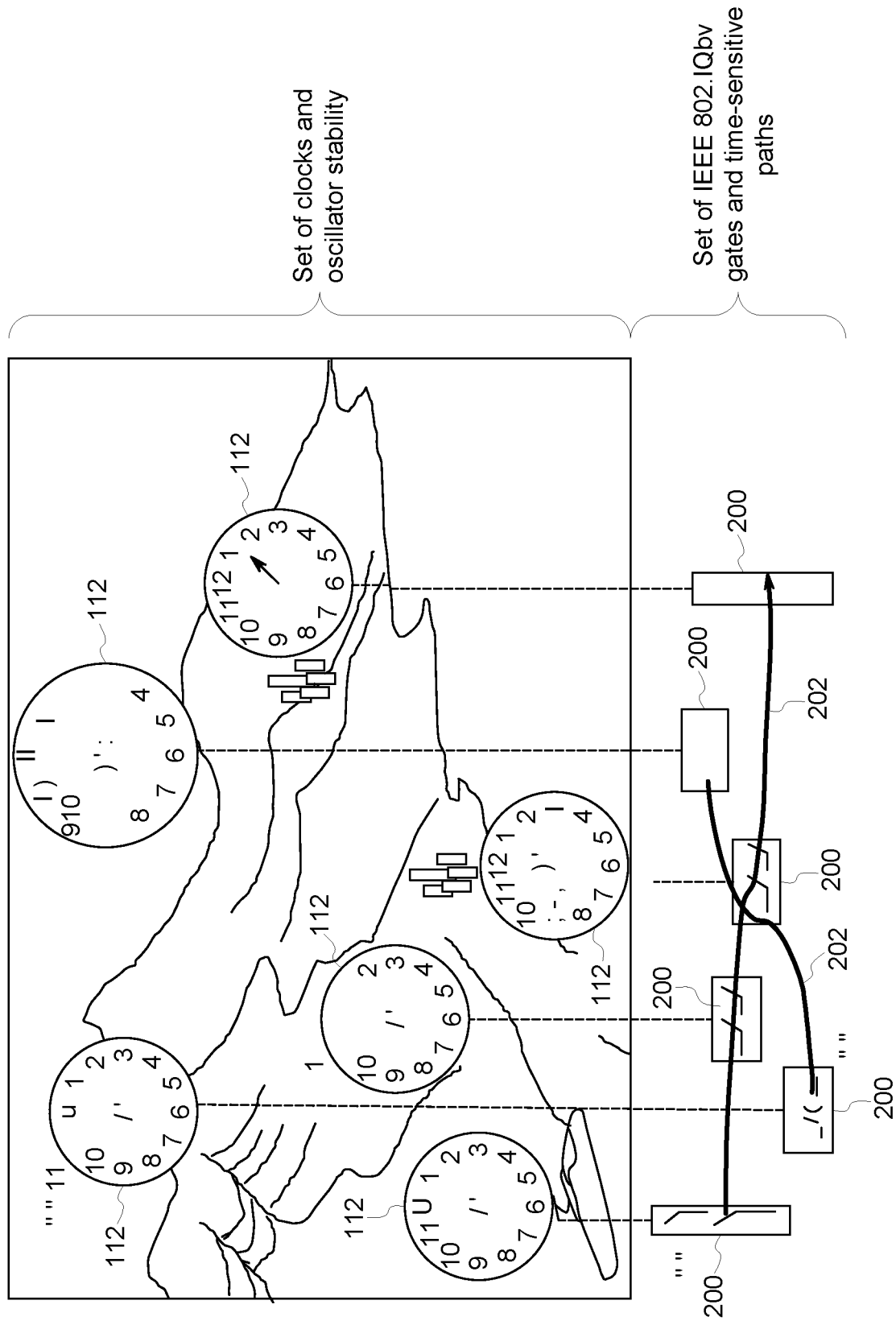
FIG. 2 illustrates a high-level concept behind the analysis described herein.

FIG. 2 schematically illustrates a high-level concept behind the analysis described herein. A network of clock devices 112 represented at the top of FIG. 2 are assumed to synchronize imperfectly with one another due to time dilation. The clock devices 112 provide timing for corresponding systems of IEEE 802.1Qbv gates 200 represented at the bottom of FIG. 2. These gates 200 can represent the nodes 105 of the network system 100 shown in FIG. 1. Time-sensitive data flows 202 of data frames between the gates 200 also are shown in FIG. 2. Clock devices 112 may never perfectly synchronize and synchronization error has an impact on the ability of time sensitive network flows 202 to operate correctly.

Time-sensitive data flows 202 cross diverse local time references and are subject to time dilation that cannot be measured by the gPTP standard. For example, FIG. 2 shows clock devices 112 located in different altitudes, and subject to different relativities. The clock devices 112 located in the mountains, for example, are synchronized to the grand master relative time (e.g., of the grandmaster clock device 110 shown in FIG. 1), but time-sensitive network data flows 202 reaching the clock devices 112 are "accelerating" because of time dilation. The configurator device 108 shown in FIG. 1 can prevent or correct for this acceleration by applying compensation on the configuration of the scheduler device 102. This compensation can occur by determining a guard band to be applied for communication of data flows at one or more of the nodes 105 or gates 200. This guard band can dynamically change as the compensation needed to correct for clock drift changes over time.

To compute the impact of time-sensitive network timing error, the scheduler device 102 computes schedules for network bridges (e.g., switches 104). The scheduler device 102 can use a heuristic approach that is non-deterministic polynomial-time hardness (NP-hard). The schedules can be computed by assuming that individual clock error is independent and normally distributed. The clock devices 112 may drift with a mean p and have a variance σ. Each gate system 200 can receive or determine time from one of the distributed clocks 112 that is synchronized by the IEEE 802.1AS standard.

Time-sensitive data flow paths are scheduled by the centralized scheduler device 102 assuming perfect synchronization. If clock synchronization fails to achieve a sufficient degree of synchronization, this failure could cause multiple Ethernet frames from different time-sensitive network flows 202 to be simultaneously transmitted on the same link. This would cause an alternate scheduling mechanism to mitigate potential collision and frame loss at the expense of an unnecessary and unpredictable delay in transmission. Thus, in the presence of synchronization error, Ethernet frames in time-sensitive network flows 202 will have a probability of exceeding their maximum, deterministic latency requirement and suffer significant jitter. Under certain synchronization errors, it may even be possible for Ethernet frames to completely miss scheduled transmission window time and catch another open window, thus impacting other time-sensitive network flows 202 that were initially scheduled on different time windows. A guard band can be dynamically calculated and added to the schedules to mitigate clock error and ensure that time-critical traffic is successfully communicated. This provides at least one technical effect of the inventive subject matter described herein. Dynamically altering the guard band can ensure that packets (that are needed to be delivered at certain designated times to ensure the same operation of systems using the time-sensitive network) are delivered on time, even with drift of clocks away from the grandmaster clock and/or other differences between the times tracked by the clocks and the master time maintained by the grandmaster clock.

In one embodiment of the inventive subject matter, the scheduler device 102 is provided the details of an Ethernet network system 100 (shown in FIG. 1) and requested time-sensitive network flows 202 and computes schedules for each flow 202. While the scheduler device 102 is designed to operate with real Ethernet networks 100 and manually crafted time-sensitive network flows 202, one component for this analysis is the ability to randomly generate large numbers of time-sensitive network flows 202 in a large, randomly generated Ethernet network 100. Thus, the scheduler device 102 is able to analyze large, complex time-sensitive network schedules in large, complex networks 100.

Random jitter can be unpredictable and is assumed to be Gaussian (e.g. thermal noise). Deterministic jitter can be predictable and bounded (e.g., duty cycle, distortion, and inter-symbol interference). Clock jitter can have a Gaussian distribution. Jitter and parts-per-million (PPM) are related by $$df = \frac{f}{10^6}$$

PPM, where f is the center frequency of an oscillator and df is the maximum frequency variation. In one embodiment, the clock devices 112 can be assumed by the scheduler device 102 to have an accuracy of +/−100 PPM with 5 picoseconds of root mean square (RMS) jitter. The RMS error can be related to Gaussian variance by $\sigma n/\sqrt{2N}$, where N is the number of samples (e.g., 10,000) and peak-to-peak period jitter equals +/−3.72 RMS jitter.

One part of the analysis performed by the scheduler device 102 examines how jitter propagates from one clock device 112 to another clock device 112. Random noise can be added by the scheduler device 102, while correlation in noise reduces the purely additive characteristic and creates additional uncertainty. The scheduler device 102 can propagate clock drift and jitter from the grandmaster clock device 110 through all other (e.g., slave) clock devices 112. For example, the other clock devices 112 can be repeatedly synchronized with the grandmaster clock device 110. The model also considers the fact that path delay reduces the ability of the gPTP standard to keep slave clock devices 112 synchronized with the grandmaster clock device 110. The scheduler device 102 implementation enables experimentation with clock accuracy and placement and determines the impact of clock accuracy experimentation on time-sensitive network scheduling.

Figure 3:
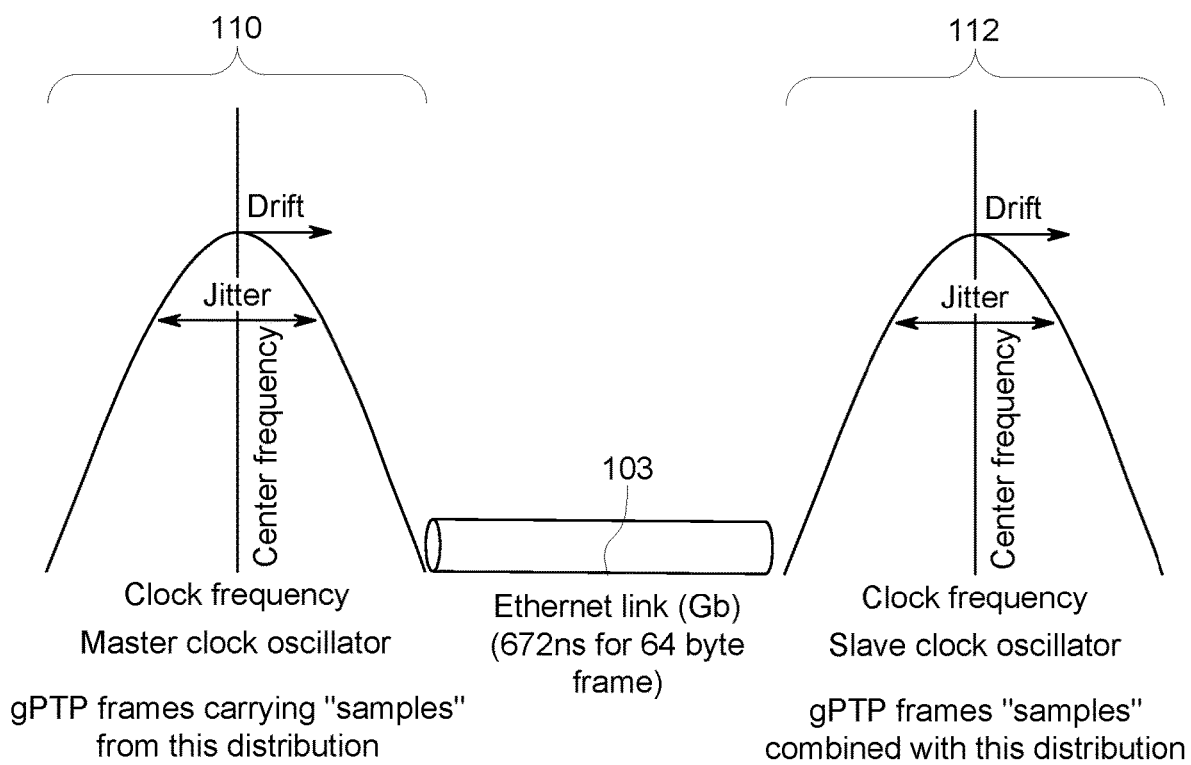
FIG. 3 illustrates a fundamental model showing a master clock and a slave clock separated by an Ethernet link.

FIG. 3 illustrates a fundamental model showing a master clock device 110 and a slave clock device 112 separated by an Ethernet link 103. The slave clock device 112 is sampling from a Gaussian distribution that represents the dynamics of oscillation in the master clock 110. The probability density function will flatten due to jitter (e.g., variance). Sync messages carrying the latest statistical sample of the time and frequency of the master clock device 110 can be periodically or otherwise repeatedly sent to the other clock devices 112. The brings the times and frequencies of the clock devices 110, 112 back into alignment, subject to drift until the next sync message is sent from the master clock device 110 to the other clock devices 112. There is a delay between corrections limited ultimately by the time to transfer a message across the link 103. As a result, the sync messages only correcting the drift (e.g., the mean), while the Gaussian probability density function for the clock devices 112 will continue to flatten further from the master clock device 110.

In one example, jitter and Allan variance can be disregarded, and only the drift for 100 PPM clock devices 110, 112 may be considered. Assuming 100 MHz clock devices 110, 112, the clock devices 110, 112 may deviate between the limits of −100,000 ns and 100,000 ns every second. If a sync message is transmitted from the master clock device 110 to the clock devices 112 every millisecond (or an even less frequent rate), a slave clock device 112 can drift from −100 ns to 100 ns, not including additional drift due to delay of communication along the link 103. Faster links and a faster sync message transmission rate can enable better synchronization between the clock devices 110, 112. Jitter, however, adds to the variance of the clock time distribution and accumulates along each hop along the links 103 from the master clock device 110.

Systemic clock inaccuracy, such as temperature change, also can have an impact. If multiple clock devices 110, 112 experience the same temperature change and drift at approximately the same rate, the clock devices 110, 112 can continue to remain correlated with one another and there is little impact on the timely communication of frames according to the schedule dictated by the scheduling device 102. If variance were impacted, however, this could have an impact. Since clock drift and variance can be independently and normally distributed, mean and variance accumulate via simple summation when experienced through time-sensitive paths 103.

Two statistical properties that impact frame scheduling are clock correlation and clock variance. One can look at the correlation of clock means and sum the clock variances of the clock devices 112 in the nodes 105 along a scheduled path 103 for communication of frames between the computing devices 106. Thus, for any set of scheduled paths 103, the probability of Ethernet frame overlap in a schedule can be determined by computing the probability of overlap of normal distributions as follows:

$$\frac{(x-\mu_2)^2}{2\sigma_2^2} - \frac{(x-\mu_1)^2}{2\sigma_1^2} = \log\frac{\sigma_1}{\sigma_2} \qquad (2)$$

This probability can reflect how likely it is that two or more frames collide on a link 103, which can result in one or all of these frames not being delivered or otherwise communicated.

In order to eliminate or reduce the likelihood of frame collisions, the scheduler device 102 can schedule the communication of frames to occur through or over routes that are along the paths 103 that are most (or more) immune to clock synchronization inaccuracy, as well as by selecting smaller (e.g., the smallest possible) guard bands that reduce the impact of timing inaccuracies.

Figure 4:
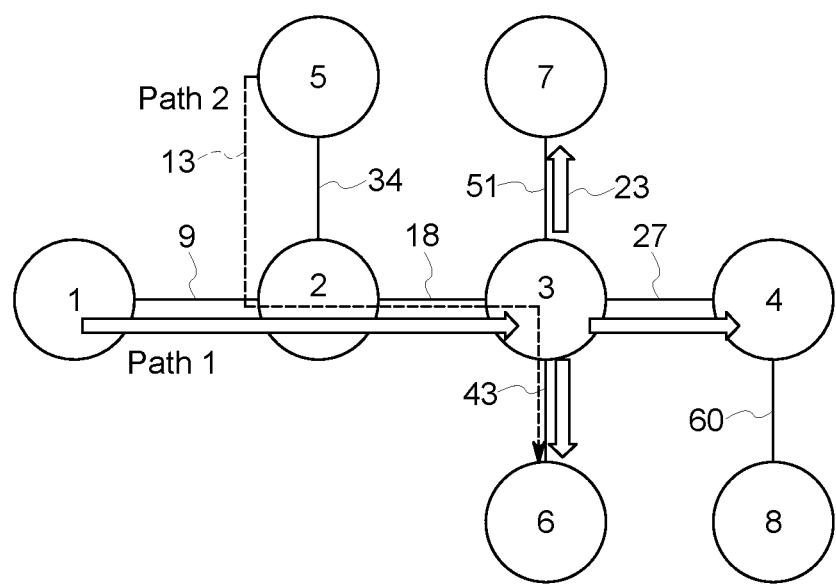
FIG. 4 illustrates one example of synchronization error analysis using multicast.

FIG. 4 illustrates one example of synchronization error analysis using multicast. Vertices are end-systems and switches 104, and are labeled one through eight. Edges are Ethernet links 103 and are also numbered in FIG. 4. Links 18 and 43 experience overlapping paths and thereby are exposed to the possibility of frame transmission overlap.

Path 1 connects vertex 1 to vertices 7, 4, and 6. Path 2 connects from vertex 5 to vertex 6. Possible contention (e.g., overlap) exists at links between vertices 2 and 3, as well as vertices 3 and 6. Each interface can be assumed to have a local clock device 112. In the illustrated example, the clock error mean is one microsecond, the variance is two microseconds, and the required or scheduled end-to-end latency for communication along each path is 80 ms.

Using the result of the scheduler device 102 for this example and the accumulated clock error along each path, Path 1 can be computed to have a mean latency of 80 ms and a probability of only 0.5 of meeting that requirement given the variance due to clock error along Path 1. Path two has a mean of 71 ms and a probability of success in meeting that latency of 0.93.

Figure 5:
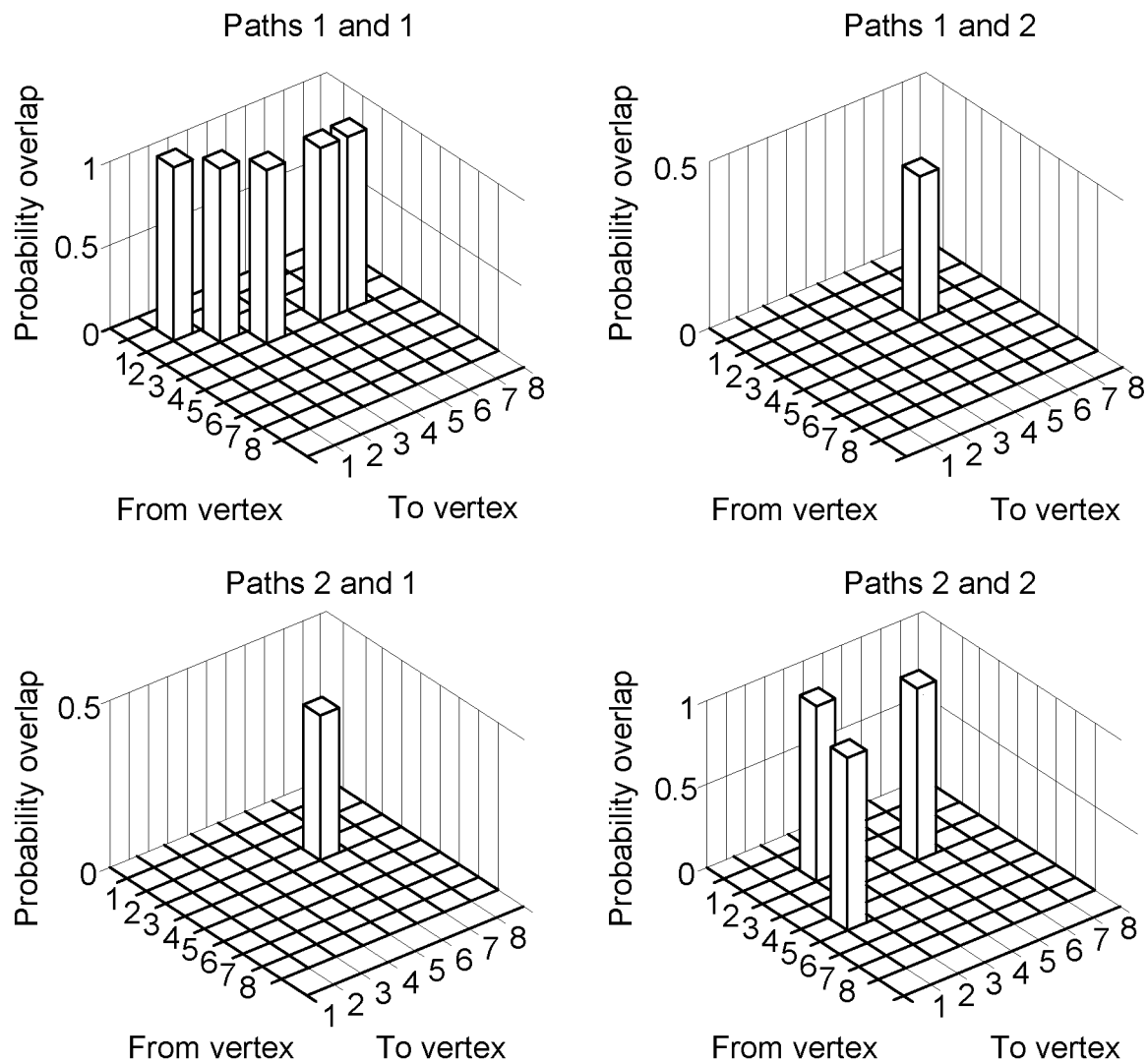
FIG. 5 illustrates probabilities of frame collision along several paths.

FIG. 5 illustrates probabilities of frame collision along several paths. FIG. 5 illustrates a matrix of bar plots showing the relationship between every pair of time-sensitive paths 103. The matrix is square, symmetric, and will have all ones along the diagonal, that is, perfect along the same paths. The probability of overlap is results in the probability of congestion, increase in latency, and loss of determinism due to adjacent traffic sharing the same channel.

FIG. 5 also shows the probability of frame buffering along each path 103 due to clock synchronization error as computed using (1). The same paths overlap perfectly with one another as shown along the diagonal. The more interesting plots are in the non-diagonal positions. Since bar graphs form a matrix, the graphs form a symmetric matrix and only examine the upper right diagonal may be examined. In the illustrated example, Paths one and two will suffer non-deterministic frame delay drops with 0.0027 ms (imperceptibly in the bar graph) at the link from vertices two to three, but there is a 0.42 probability of delay at the link from vertices three to six in this example.

The notion of time-sensitive network time dilation for guard bands leads to consideration of the prospects and implications of physical gravitational time dilation. The uncertainty in time increases with the distance from the grandmaster clock device 110, and this uncertainty requires a proportionally-sized mechanism for compensation, typically a guard band in the network 101. A guard band effectively increases the Ethernet frame size by increasing the duration that a gate 200 is open, and thus stretching the effective length of the time-sensitive network frame. A gate 200 is open during a time period that is scheduled by the scheduler device 102 for communication of data packets through the switch in that gate 200. The scheduler device 102 can determine a guard band as a time period or bandwidth that a gate 200 remains open for communicating data packets. The scheduler device 102 can repeatedly determine the clock drift and variance for multiple clock devices 112 and, based on the drift and/or variance, determine a probability that Ethernet frames will collide along one or more paths 103 in the network. If the probability is sufficiently large (e.g., greater than a non-zero, previously defined threshold, such as 15%, 20%, or the like), then the scheduler device 102 determines and creates a dynamically adjustable guard band for one or more nodes 105. The guard band defines time periods and/or network bandwidth that cannot be used by the node(s) 105 for communication of frames along one or more links 103.

The effective change in length of a data frame varies with distance of the slave clock device 112 from the grandmaster clock device 110. For example, clock devices 112 that are farther from the grandmaster clock device 110 (e.g., along links 103 in the Ethernet network) may have larger guard bands determined by the scheduler device 102. This effective change in length can be referred to as time dilation in analogy with gravitational time dilation from general relativity. The scheduler device 102 can use a guard band to guarantee that the switch 104 is idle when time-sensitive network frames are transmitted at the cost of dedicating bandwidth for protection. The scheduler device 102 can change the size of the guard band for a node 105 at different times based on clock drift and/or variance. Thus, the size of the guard band can be dynamically changed by the scheduler device 102 to reduce or minimize the time during which a switch 104 is idle, while maintaining determinism in the delivery of time-sensitive network frames.

Not all embodiments of the inventive subject matter described herein are limited to wired networks. One or more embodiments of the inventive subject matter can be used in connection with entirely or partially wireless time-sensitive networks. When time-sensitive network devices are subject to change in motion or altitude, the scheduler device 102 is affected by time dilation. Guard band sizes can be controlled (e.g., by the scheduler device 102) as functions not only of distance of a clock device 112 from the grandmaster clock device 110, but also of port speed and clock height and speed. For example, the scheduler device 102 can create larger guard bands for longer distances along the links 103 between a slave clock device 112 and the master clock device 110, and can create smaller guard bands for shorter distances along the links 103 between a slave clock device 112 and the master clock device 110. The scheduler device 102 can create larger guard bands for switches 104 that are slower in communicating data frames and can create smaller guard bands for switches 104 that are faster in communicating the data frames. The scheduler device 102 can create larger guard bands for clock devices 112 located at higher altitudes and can create smaller guard bands for clock devices 112 located at lower altitudes. The scheduler device 102 can create larger guard bands for clock devices 112 that are faster or slower than the master clock device 110 by larger time differences, and can create smaller guard bands for clock devices 112 that are faster or slower than the master clock device 110 by smaller time differences.

The guard band size can be set by the scheduler device 102 considering a worst-case scenario, for instance, based on the distance of a grandmaster clock device 110 and the height or speed of the clock device 112. A control plane can be used to advertise height and speed of the different clocks device 112 to enable switches 104 to continuously or repeatedly adjust the size of the guard band based on the gPTP error correction and time dilation.

The scheduler device 102 can rely on several metrics and values to allocate a guard band of a variable (e.g., dynamic, or changing with respect to time) size. The scheduler device 102 can calculate an eigenvalue centrality measure for one or more of the nodes 105, which can represent an overall shape of the network 100. Longer, thin networks 100 are subject to bigger guard bands than small compact networks 100. For example, networks 100 formed from fewer nodes 105, fewer links 103, and/or having fewer alternate paths of links 103 and nodes 105 between devices 106 for data frame communication can be allocated larger guard bands by the scheduler device 102 than networks 100 formed from more nodes 105, more links 103, and/or having more alternate paths of links 103 and nodes 105 for communication of data frames between the devices 106. Additionally, nodes 105 that are farther from the master clock device 110 and/or are farther from a center of the network 100 may be assigned larger guard bands than nodes 105 that are closer to the master clock device 110 and/or the center of the network 100.

The clock variance at different nodes 105 impacts time-to-time clock measurement and is accumulated by all traversed nodes 105. The variance is an additive parameter in that the total clock variance between the clock devices 112 and the master clock device 110 increases for more nodes 105 along a path for a data frame and/or for larger differences between the clock devices 112 and the master clock device 110 along the path. The scheduler device 102 can fetch all or many of the variances from the network 100 and compute the total variance of one or more paths through the network 100. The scheduler device 102 can also apply an overall eigenvalue centrality metric that provides a global variance value of the network 100. Each node 105 can add up a local variance of that node 105 and the clock reference variance to the global variance of the network 100. When the network 100 is made of different time domains with different reference clock devices 112, the eigenvalue centrality metrics may differ from one domain to another. The accumulated drift may also differ because the clock references do not necessarily send synchronization messages at the same rate and the same speed. If a time-sensitive network stream needs to cross multiple time domains, the guard band determined by the scheduler device 102 corresponding to the node 105 egressing to a new domain is the maximum of this node 105.

By applying an optimal guard band the network resource usage used by the guard band can be decreased, and the heuristic finds more solution to establish a new time-sensitive network stream (and the number of time-sensitive network streams on a network is statistically higher with optimal guard bands). This can lead to a reduced OPEX and a reduced cost per bit of data sent over the network 100.

The scheduler device 102 can use eigenvector centrality to estimate the impact of time-sensitive network time dilation. Eigenvector centrality measures or represents the importance of a node 105 in the network 100, such as how far the node 105 is from a location another node 105, the grandmaster clock device 110, the center of the network 100, etc. This importance of the node 105 can go beyond simply counting the number of computer devices 106 that interface with the node 105, but also can include the degree to which a computer device 106 supports the interconnection of other highly-connected computer devices 106.

The network edges are weighted by link speed. Let x be the centrality measure, a be either zero or one as indicated in the adjacency matrix, λ a constant, and f and t indicate the "from" and "to" indices of a vertex in the adjacency matrix respectively as shown in:

$$x_f = \frac{1}{\lambda} \sum_t a_{ft} x_t \qquad (3)$$

This simplifies to (4) below, where λ is the eigenvalue of the adjacency matrix A. The eigenvector solutions play a wide range of roles in network partitioning, dimensionality reduction, and many other applications. For the centrality measure, the eigenvectors are non-negative. This means λ will be the largest of the many possible eigenvalue solutions, or may be larger than most (but not all) possible eigenvalue solutions.

$$Ax = \lambda x \qquad (4)$$

Thus, the eigenvalue centrality of a vertex is simply the eigenvector element corresponding to the vertex derived from the adjacency matrix corresponding the largest eigenvalue. The eigenvector centrality for each node 105 is viewed as a gravitational gradient through which time-sensitive network flows travel. Consider what the eigenvalue centrality value for a node 105 means if the adjacency matrix is weighted by link speed. The centrality value is a scale factor that provides a time dilation correction based upon the topology of the network 100.

A rate of synchronization messages reported to the local clock drift of the traversed nodes 104 also can be determined by the scheduler device 102. The scheduler device 102 can allocate smaller guard bands for faster synchronization rates and can allocate larger guard bands for slower synchronization rates. The effect of sync locks, and needs for adjusting flows crossing different time domains, and then subject to time discrepancies also can be determined by the scheduler device 102.

Figure 6:
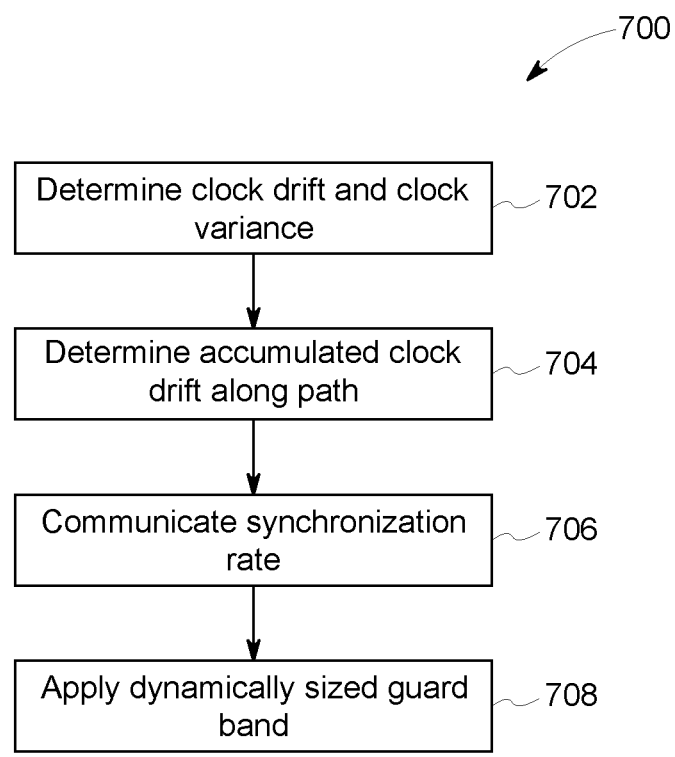
FIG. 6 illustrates a flowchart of one embodiment of a method for dynamically determining guard bands for a time-sensitive network.

FIG. 6 illustrates a flowchart of one embodiment of a method 700 for dynamically determining guard bands for a time-sensitive network. At 702, the clock drifts and the clock variances of nodes 105 can be determined. At 704, a maximum or upper accumulated clock offset along a time-sensitive network path of links 103 and nodes 105 is determined. This can be a sum of the clock offsets (e.g., drifts and/or variances) or a sum of the absolute values of the clock offsets) of the clocks 112 of the nodes along a path between the devices 106.

At 706, a synchronization rate is communicated to the scheduler devices 102. This rate can be adapted to the conditions of the network 100 so that clock drifts can be diminished. This rate can indicate how frequently the clock devices 112 of the nodes 105 are synchronized with the master clock device 110. At 708, one or more guard bands of dynamic size is determined by and communicated from the scheduler device 102 to the nodes 105. A guard band can have a size that is based on the schedules of the nodes 105, as well as based on other factors described herein. If multiple time domains are present in the network 100, then the dynamic guard band can be applied on the border schedule.

For a node 105, the guard band can be inserted before and after the scheduled window time of the node 105 for forwarding a time-sensitive network frame. As a result, if the local clock device 112 of the node 105 is slightly in advance or late from the universal time of the grandmaster clock device 110, the queue at the node 105 that forwards this frame is maintained open for a duration that is proportional to or otherwise based on the size of the guard band. The size of a guard band can be adjusted to the maximum local time error of this node 105 in one embodiment. A node 105 can measure frequency error of the node 105 on a real-time basis, which also can be used to dynamically adapt the guard band to environmental conditions such as the temperature and the aging of the clock device 112 of that node 105.

Table 1 below shows the delay before the scheduler device 102 is effected by between two points within a gravitational time dilation at the point that may make a time-sensitive Ethernet frame of 64 bytes miss an associated schedule. Table 1 illustrates the difference in height of clock devices 112 on the scheduler device 102, for a time-sensitive Ethernet frame of 64 bytes, and as a function of the network transmission speed. The times expressed in the table show how long a service must be uninterrupted before seeing such a frame miss a scheduled time window.

TABLE 1

| Δ Height | 10 Gbps | 100 Gbps | 1 Tbps |
|---|---|---|---|
| 10 m | 707 days | 70 days | 7 days, 1 hour, 41 minutes, and 49 seconds |
| 100 m | 70 days | 7 days, 1 hour, 41 minutes, and 49 seconds | 16 hours, 58 minutes, and 10 seconds |

TABLE 1-continued

| Δ Height | 10 Gbps | 100 Gbps | 1 Tbps |
| --- | --- | --- | --- |
| 1000 m | 7 days, 1 hour, 41 minutes, and 49 seconds | 16 hours, 58 minutes, and 10 seconds | 1 hour, 41 minutes, and 4 seconds |

For example, a difference of 100 m from sea level between two clock devices 112 will result in time dilation of 1.000000000000011 s. Even if this change may be too small to be represented by an offset scaled rate ratio in gPTP frames, this leads to a cumulated drift of 11 femtosecond per second of usage. Time dilation effects become important after 14 days and 3 hours causing a time-sensitive frame of 128 bytes to miss its schedule at 100 Gbps.

Special relativity applies to devices in motion. In general, this effect can be neglected. However, when high precision timing is required, correction may need to be applied to the scheduler device 102. Note that this time dilation differs from the Doppler-Fizeau effect impacting the frequency of communication of mobile devices. As the gravitational time dilation, this cannot be measured by gPTP, and a GNSS receiver is not able to apply correction induced by the speed of the device. Table 2 shows different effects of speed on the time dilation observed by a device in motion. Three different speed are shown here and correspond respectively to a car driving on a highway, a high-speed train, and an airplane in motion. Table 2 shows the difference of speed on the scheduler device 102, for a time-sensitive frame of 64 bytes, and as a function of the network transmission speed. The times expressed in the table show how long a service must be uninterrupted before seeing such a frame miss its time window.

TABLE 2

| Δ Speed | 10 Gbps | 100 Gbps | 1 Tbps |
| --- | --- | --- | --- |
| 30 ms$^{-1}$ | 159 days | 2 weeks | 38 hours, 15 minutes, and 5 seconds |
| 90 ms$^{-1}$ | 2 weeks | 41 hours, 28 minutes, and 53 seconds | 4 hours, 8 minutes, and 53 seconds |
| 300 ms$^{-1}$ | 37 hours and 20 minutes | 3 hours and 44 minutes | 22 minutes and 24 seconds |

Special relativity applies to devices in motion. In general, this effect can be neglected. However, when high precision timing is required, correction must be applied to the scheduler device 102. Note that this time dilation differs from the Doppler-Fizeau effect impacting the frequency of communication of mobile devices. As the gravitational time dilation, this cannot be measured by gPTP, and a GNSS receiver is not able to apply correction induced by the speed of the device. Table 2 shows different effects of speed on the time dilation observed by a device in motion. Three different speed are shown here and correspond respectively to a car driving on a highway, a high-speed train, and an airplane in motion. Table 2 shows the difference of speed on the scheduler device 102, for a time-sensitive frame of 64 bytes, and as a function of the network transmission speed. The times expressed in the table show how long a service must be uninterrupted before seeing such a frame miss its time window.

As a result, the scheduler device 102 optionally can dynamically change the size of a guard band for a node 105 depending on or based on motion of the node 105. The scheduler device 102 can calculate larger guard bands for nodes 105 that are moving or moving faster than the guard bands for stationary or slower moving nodes 105.

In one embodiment, a method includes determining a clock drift and a clock variance of each node in plural nodes of a time-sensitive Ethernet network, determining an accumulated clock offset along a time-sensitive network path in the time-sensitive network based on the clock drifts and the clock variances that are determined, determining a guard band having a dynamic size based on the accumulated clock offset, and restricting when Ethernet frames are communicated through the nodes by communicating the guard band with the dynamic size to one or more of the nodes.

Optionally, the method also includes determining an eigenvalue centrality metric based on a location of one or more of the nodes in the time-sensitive network, where the dynamic size of the guard band is based on the eigenvalue centrality metric.

Optionally, the method also includes determining a rate at which clock synchronization messages are reported to the nodes along the time-sensitive network path, where the dynamic size of the guard band is based on the rate at which clock synchronization messages are reported to the nodes along the time-sensitive network path.

Optionally, the method also includes inserting the guard band before and after a scheduled window time of forwarding a time-sensitive network frame at each of the nodes.

Optionally, the clock drift and the clock variance are determined for local clock devices of the nodes relative to a master clock device for the Ethernet network.

Optionally, the guard band is determined as one or more of a time period or a bandwidth in which non-time-critical Ethernet frame traffic cannot be communicated through the nodes.

Optionally, the guard band is determined based on distances between clock devices of the nodes and a master clock device of the Ethernet network.

Optionally, the guard band is determined based on one or more of altitudes or speeds of clock devices of the nodes.

Optionally, the guard band is determined based on motion of one or more of the nodes.

In one embodiment, a system includes one or more processors configured to determine a clock drift and a clock variance of each node in plural nodes of a time-sensitive network. The one or more processors also are configured to determine an accumulated clock offset along a time-sensitive network path in the time-sensitive network based on the clock drifts and the clock variances that are determined. The one or more processors also are configured to determine a guard band having a dynamic size based on the accumulated clock offset and to communicate the guard band with the dynamic size to the nodes. The one or more processors are configured to allocate the guard band to at least one of the nodes. The guard band restricts when Ethernet frames are communicated through the at least one of the nodes.

Optionally, the one or more processors also are configured to determine an eigenvalue centrality metric based on a location of one or more of the nodes in the time-sensitive network. The one or more processors can be configured to determine the dynamic size of the guard band based on the eigenvalue centrality metric.

Optionally, the one or more processors are configured to determine a rate at which clock synchronization messages are reported to the nodes along the time-sensitive network path. The one or more processors can be configured to determine the dynamic size of the guard band based on the rate at which clock synchronization messages are reported to the nodes along the time-sensitive network path.

Optionally, one or more processors are configured to insert the guard band before and after a scheduled window time of forwarding a time-sensitive network frame at each of the nodes.

Optionally, the one or more processors are configured to determine the clock drift and the clock variance for local clock devices of the nodes relative to a master clock device for the Ethernet network.

Optionally, the one or more processors are configured to determine the guard band as one or more of a time period or a bandwidth in which non-time-critical Ethernet frame traffic cannot be communicated through the nodes.

Optionally, the one or more processors are configured to determine distances between clock devices of the nodes and a master clock device of the Ethernet network. The one or more processors also are configured to determine the guard band based on the distances that are determined.

Optionally, the one or more processors are configured to determine the guard band based on one or more of altitudes or speeds of clock devices of the nodes.

In one embodiment, a system includes one or more processors configured to determine clock drifts and clock variances of plural nodes in a time-sensitive Ethernet network. The one or more processors also are configured to determine an eigenvalue centrality metric based on a location of one or more of the nodes in the time-sensitive network. The one or more processors are configured to dynamically allocate a guard band to one or more of the nodes to prevent communication of one or more Ethernet frames through the one or more nodes during the guard band in a time sensitive network schedule of the Ethernet network. The one or more processors are configured to dynamically allocate the guard band based on the clock drifts, the clock variances, and the eigenvalue centrality metric.

Optionally, the one or more processors are configured to dynamically allocate the guard band by changing a size of the guard band responsive to a change in one or more of the clock drifts, the clock variances, or the eigenvalue centrality metric.

Optionally, the one or more processors are configured to determine an accumulated clock offset of the nodes along a path between two or more computer devices based on the clock drifts and the clock variances associated with the nodes along the path. The one or more processor can be configured to allocate the guard band based on the accumulated clock offset.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A method comprising:
   determining a clock drift and a clock variance of each node in plural nodes of a time-sensitive Ethernet network;
   determining an accumulated clock offset along a time-sensitive network path in the time-sensitive network based on the clock drifts and the clock variances that are determined;
   determining an eigenvalue centrality metric based on a location of one or more of the nodes in the time-sensitive network;
   determining a guard band having a dynamic size based on the accumulated clock offset and the eigenvalue centrality metric, wherein the dynamic size of the guard band is based on the eigenvalue centrality metric; and
   restricting when Ethernet frames are communicated through the nodes by communicating the guard band with the dynamic size to one or more of the nodes.

2. The method of claim 1, further comprising:
   determining a rate at which clock synchronization messages are reported to the nodes along the time-sensitive network path,
   wherein the dynamic size of the guard band is based on the rate at which clock synchronization messages are reported to the nodes along the time-sensitive network path.

3. The method of claim 1, further comprising:
   inserting the guard band before and after a scheduled window time of forwarding a time-sensitive network frame at each of the nodes.

4. The method of claim 1, wherein the clock drift and the clock variance are determined for local clock devices of the nodes relative to a master clock device for the Ethernet network.

5. The method of claim 1, wherein the guard band is determined as one or more of a time period or a bandwidth in which non-time-critical Ethernet frame traffic cannot be communicated through the nodes.

6. The method of claim 1, wherein the guard band is determined based on distances between clock devices of the nodes and a master clock device of the Ethernet network.

7. The method of claim 1, wherein the guard band is determined based on one or more of altitudes or speeds of clock devices of the nodes.

8. The method of claim 1, wherein the guard band is determined based on motion of one or more of the nodes.

9. A system comprising:
one or more processors configured to determine a clock drift and a clock variance of each node in plural nodes of a time-sensitive network, the one or more processors also configured to determine an accumulated clock offset along a time-sensitive network path in the time-sensitive network based on the clock drifts and the clock variances that are determined, the one or more processors also configured to determine a guard band having a dynamic size based on the accumulated clock offset and an eigenvalue centrality metric, the one or more processors configured to communicate the guard band with the dynamic size to the nodes, the one or more processors configured to allocate the guard band to at least one of the nodes, the guard band restricting when Ethernet frames are communicated through the at least one of the nodes,
wherein the one or more processors also are configured to determine the eigenvalue centrality metric based on a location of one or more of the nodes in the time-sensitive network, wherein the one or more processors are configured to determine the dynamic size of the guard band based on the eigenvalue centrality metric.

10. The system of claim 9, wherein the one or more processors are configured to determine a rate at which clock synchronization messages are reported to the nodes along the time-sensitive network path, wherein the one or more processors are configured to determine the dynamic size of the guard band based on the rate at which clock synchronization messages are reported to the nodes along the time-sensitive network path.

11. The system of claim 9, wherein the one or more processors are configured to insert the guard band before and after a scheduled window time of forwarding a time-sensitive network frame at each of the nodes.

12. The system of claim 9, wherein the one or more processors are configured to determine the clock drift and the clock variance for local clock devices of the nodes relative to a master clock device for the Ethernet network.

13. The system of claim 9, wherein the one or more processors are configured to determine the guard band as one or more of a time period or a bandwidth in which non-time-critical Ethernet frame traffic cannot be communicated through the nodes.

14. The system of claim 9, wherein the one or more processors are configured to determine distances between clock devices of the nodes and a master clock device of the Ethernet network, the one or more processors also configured to determine the guard band based on the distances that are determined.

15. The system of claim 9, wherein the one or more processors are configured to determine the guard band based on one or more of altitudes or speeds of clock devices of the nodes.

16. A system comprising:
one or more processors configured to determine clock drifts and clock variances of plural nodes in a time-sensitive Ethernet network, the one or more processors also configured to determine an eigenvalue centrality metric based on a location of one or more of the nodes in the time-sensitive network,
wherein the one or more processors are configured to dynamically allocate a guard band to one or more of the nodes to prevent communication of one or more Ethernet frames through the one or more nodes during the guard band in a time sensitive network schedule of the Ethernet network, the one or more processors configured to dynamically allocate the guard band based on the clock drifts, the clock variances, and the eigenvalue centrality metric, wherein a dynamic size of the guard band is based on the eigenvalue centrality metric.

17. The system of claim 16, wherein the one or more processors are configured to dynamically allocate the guard band by changing the dynamic size of the guard band responsive to a change in one or more of the clock drifts, the clock variances, or the eigenvalue centrality metric.

18. The system of claim 16, wherein the one or more processors are configured to determine an accumulated clock offset of the nodes along a path between two or more computer devices based on the clock drifts and the clock variances associated with the nodes along the path, wherein the one or more processor are configured to allocate the guard band based on the accumulated clock offset.

* * * * *